(12) United States Patent
Sakai (10) Patent No.: US 7,859,766 B2
(45) Date of Patent: Dec. 28, 2010

(54) ZOOM LENS AND IMAGE PICKUP APPARATUS INCLUDING THE SAME

(75) Inventor: Hideki Sakai, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 55 days.

(21) Appl. No.: 12/472,679

(22) Filed: May 27, 2009

(65) Prior Publication Data

US 2009/0296230 A1    Dec. 3, 2009

(30) Foreign Application Priority Data

May 30, 2008    (JP)    ............... 2008-142351

(51) Int. Cl.
*G02B 15/14*    (2006.01)
(52) U.S. Cl. .................................... 359/687
(58) Field of Classification Search ................. 359/686, 359/687, 681, 684, 695
See application file for complete search history.

(56) References Cited

U.S. PATENT DOCUMENTS 6,975,461 B2    12/2005    Eguchi
7,193,790 B2    3/2007    Hamano
2007/0091460 A1*    4/2007    Saruwatari et al. .......... 359/687

FOREIGN PATENT DOCUMENTS

| JP | 07-128619 A | 5/1995 |
| JP | 2006-106111 A | 4/2006 |

* cited by examiner

*Primary Examiner*—Alicia M Harrington
(74) *Attorney, Agent, or Firm*—Canon U.S.A., Inc. I.P. Division

(57) ABSTRACT

Provided is a zoom lens including in order from an object side to an image side: a first lens unit having a positive refractive power; a second lens unit having a negative refractive power; a third lens unit having a positive refractive power; and a fourth lens unit having a positive refractive power, each of the first lens unit, the second lens unit, the third lens unit, and fourth lens unit moving to perform zooming, in which M3 representing a moving amount of the third lens unit on an optical axis during zooming from a wide angle end to a telephoto end, Lt representing a total lens length on the telephoto end, f3 representing a focal length of the third lens unit, and ft representing a focal length of an entire lens system on the telephoto end are each appropriately set.

12 Claims, 7 Drawing Sheets

ZOOM LENS AND IMAGE PICKUP APPARATUS INCLUDING THE SAME

BACKGROUND OF THE INVENTION

1. Field of the Invention

The present invention relates to a zoom lens suitable for an image pickup apparatus such as a still camera, a video camera, a broadcast camera, or a digital still camera.

2. Description of the Related Art

Recently, an image pickup apparatus (camera) such as a video camera or a digital still camera using a solid-state image pickup device has achieved a higher function and overall miniaturization.

An image taking optical system used for such an image pickup apparatus is required to be a zoom lens short in total length, compact, and high in zoom ratio, and have high optical performance over an entire zoom range.

There is known a four-unit zoom lens which includes four lens units, i.e., first to fourth lens units having positive, negative, positive, and positive refractive powers in order of an object side to an image side.

A zoom lens disclosed in U.S. Pat. No. 6,975,461 performs zooming by moving the first to third lens units, and focusing by moving the fourth lens unit.

Each of zoom lenses disclosed in U.S. Pat. No. 7,193,790 and Japanese Patent Application Laid-Open No. 2006-106111 performs zooming by moving all the first to fourth lens units.

The zoom lens of U.S. Pat. No. 7,193,790 includes an F-number determining member positioned between a vertex of a lens surface of the third lens unit, which is nearest to an object side, and an intersecting point of the object-side lens surface and a peripheral portion of the lens. Thus, the entire system is miniaturized by shortening an interval between the second and third lens units on a telephoto end and setting a zoom ratio to five times or more.

Meanwhile, there is known a zoom lens which has an image-stabilizing function for correcting an image blur caused by vibration of the image pickup apparatus. Japanese Patent Application Laid-Open No. H07-128619 discloses a zoom lens which includes first to fourth lens units having positive, negative, positive, and positive refractive powers in order of an object side to an image side, and corrects an image blur by moving the third lens in a direction perpendicular to an optical axis.

Generally, in order to miniaturize the zoom lens, a moving amount of each lens unit accompanying zooming may be reduced while increasing a refractive power of each lens unit forming the zoom lens, and the number of lenses is reduced for each lens unit.

In such a zoom lens, however, aberration variation accompanying zooming increases, resulting in great difficulty in obtaining high optical performance over the entire zoom range or on the entire screen.

In order to achieve a high zoom ratio and miniaturize the entire lens system, therefore, appropriate setting of a zoom type, a refractive power of each lens unit, moving conditions accompanying zooming of each lens unit, a position of an F-number stop for limiting an open F-number beam, and the like is important.

For example, in the case of the 4-unit zoom lens, appropriate setting of a refractive power or a moving amount of the third lens unit which moves during zooming, and a total lens length of the entire system is important.

Inappropriate setting of such structures results in difficulty in obtaining a compact zoom lens which exhibits high optical performance while securing a high zoom ratio.

SUMMARY OF THE INVENTION

A zoom lens according to the present invention includes in order from an object side to an image side: a first lens unit having a positive refractive power; a second lens unit having a negative refractive power; a third lens unit having a positive refractive power; and a fourth lens unit having a positive refractive power, each of the first lens unit, the second lens unit, the third lens unit, and the fourth lens unit moving to perform zooming, in which the following conditions are satisfied:

$$-0.50 < M3/Lt < -0.25;\text{ and}$$

$$0.20 < f3/ft < 0.40,$$

where M3 represents a moving amount of the third lens unit on an optical axis during zooming from a wide angle end to a telephoto end, Lt represents a total lens length on the telephoto end, f3 represents a focal length of the third lens unit, and ft represents a focal length of an entire lens system on the telephoto end.

According to the present invention, there can be provided a compact zoom lens which can achieve a high zoom ratio and high optical performance over the entire zoom range, and an image pickup apparatus including the same.

Further features of the present invention will become apparent from the following description of exemplary embodiments with reference to the attached drawings.

DESCRIPTION OF THE EMBODIMENTS

Hereinafter, embodiments of a zoom lens of the present invention and an image pickup apparatus including the same are described.

The zoom lens of the present invention includes a first lens unit of a positive refractive power, a second lens unit of a negative refractive power, a third lens unit of a positive refractive power, and a fourth lens unit of a positive refractive power in order from an object side to an image side, and performs zooming by moving each lens unit.

Figure 1:
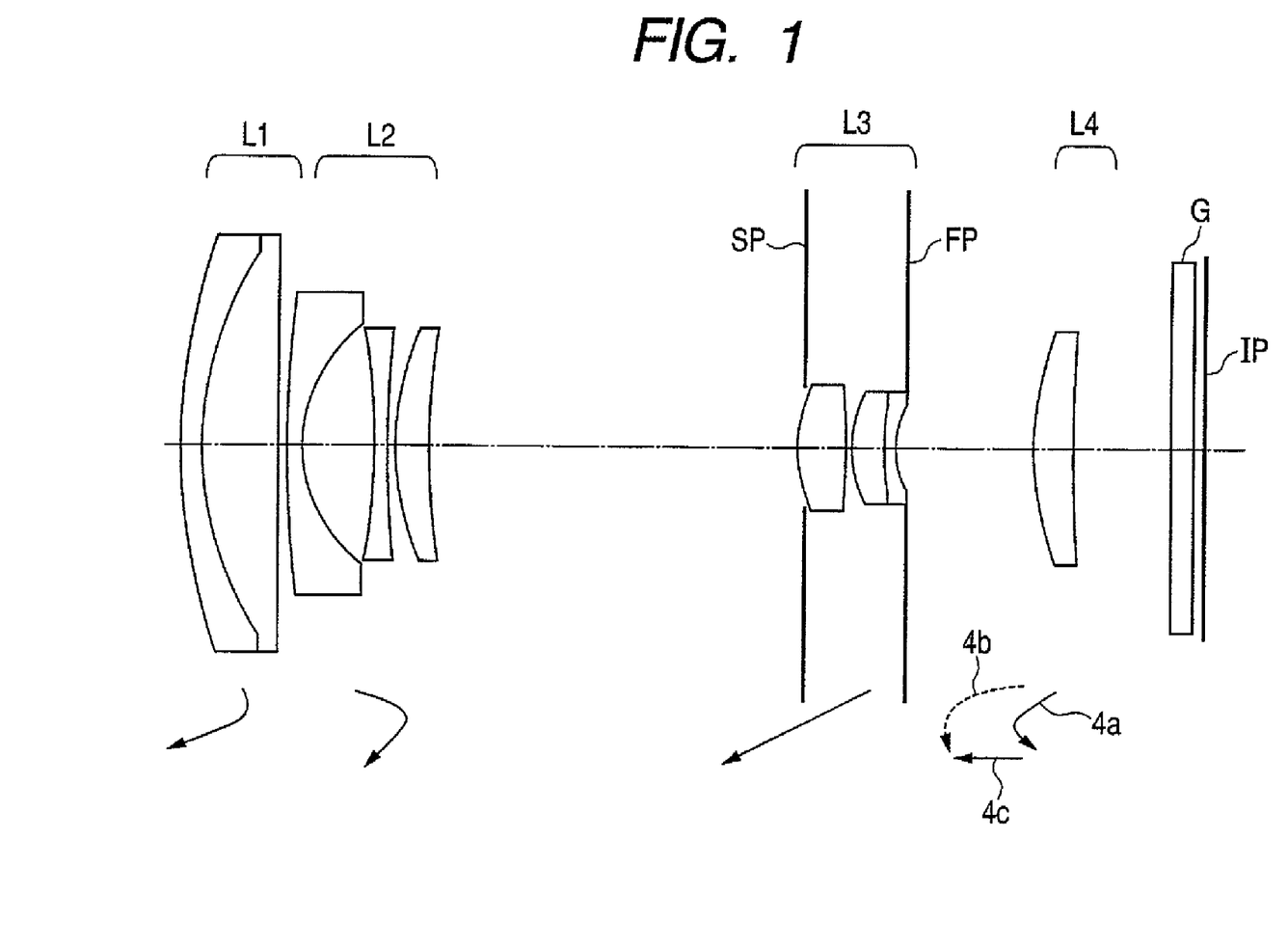
FIG. 1 is an optical sectional diagram illustrating a zoom lens according to a first embodiment.
Figure 2A:
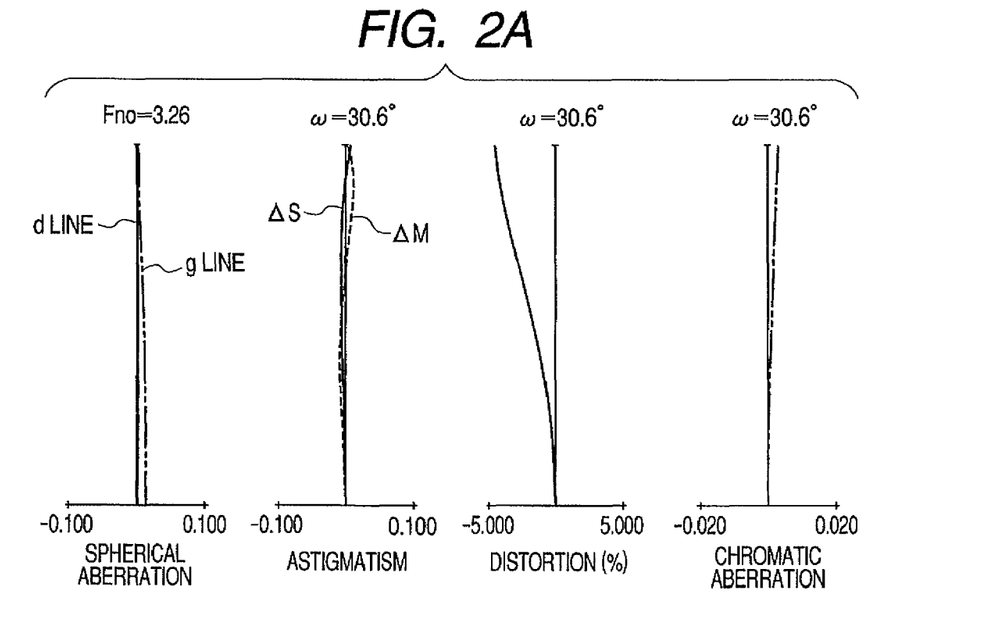
FIGS. 2A and 2B illustrate aberrations of the zoom lens of the first embodiment.
Figure 2B:
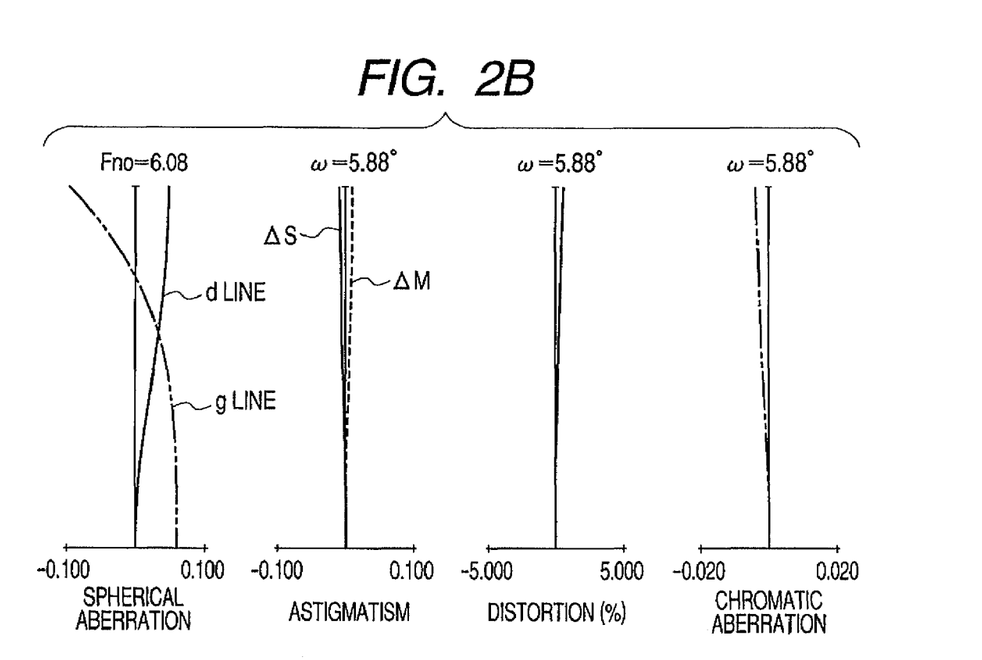

FIG. 1 is a lens sectional diagram on a wide angle end (short focal length) of a zoom lens according to a first embodiment. FIG. 2A is an aberration diagram on the wide angle end of the zoom lens of the first embodiment. FIG. 2B is an aberration diagram on a telephoto end (long focal length) of the zoom lens of the first embodiment.

Figure 3:
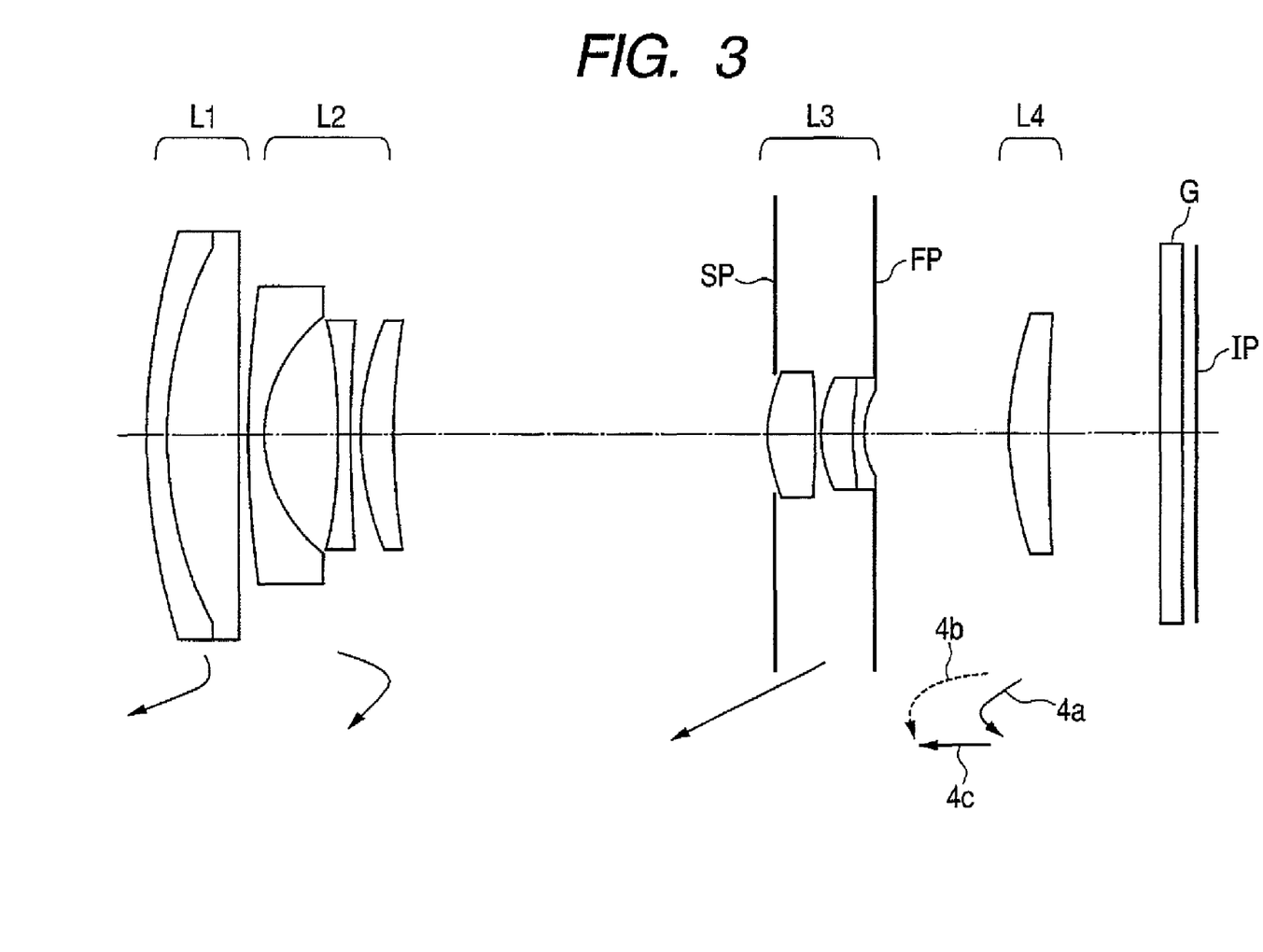
FIG. 3 is an optical sectional diagram illustrating a zoom lens according to a second embodiment
Figure 4A:
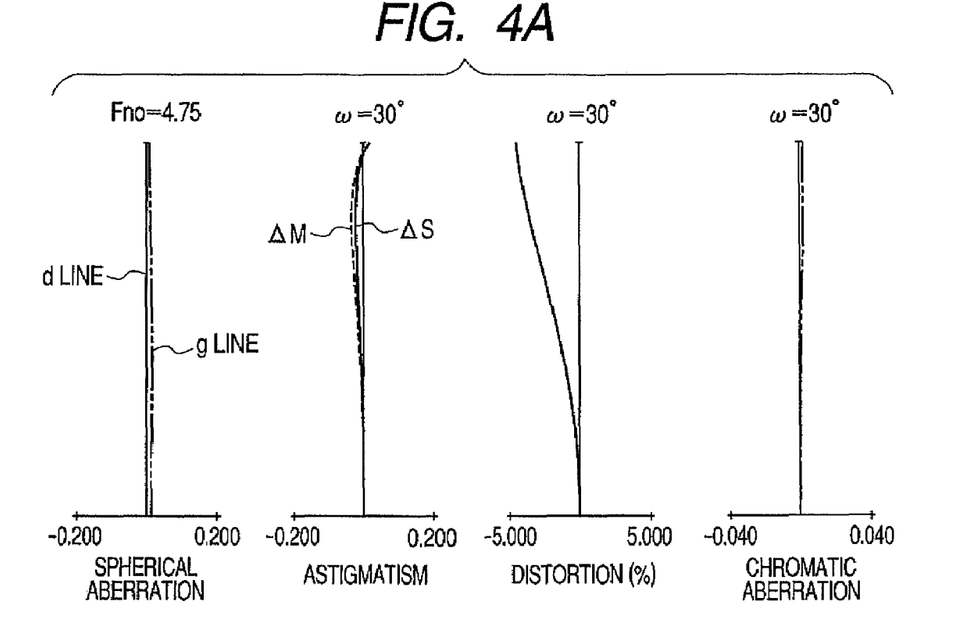
FIGS. 4A and 4B illustrate aberrations of the zoom lens of the second embodiment
Figure 4B:
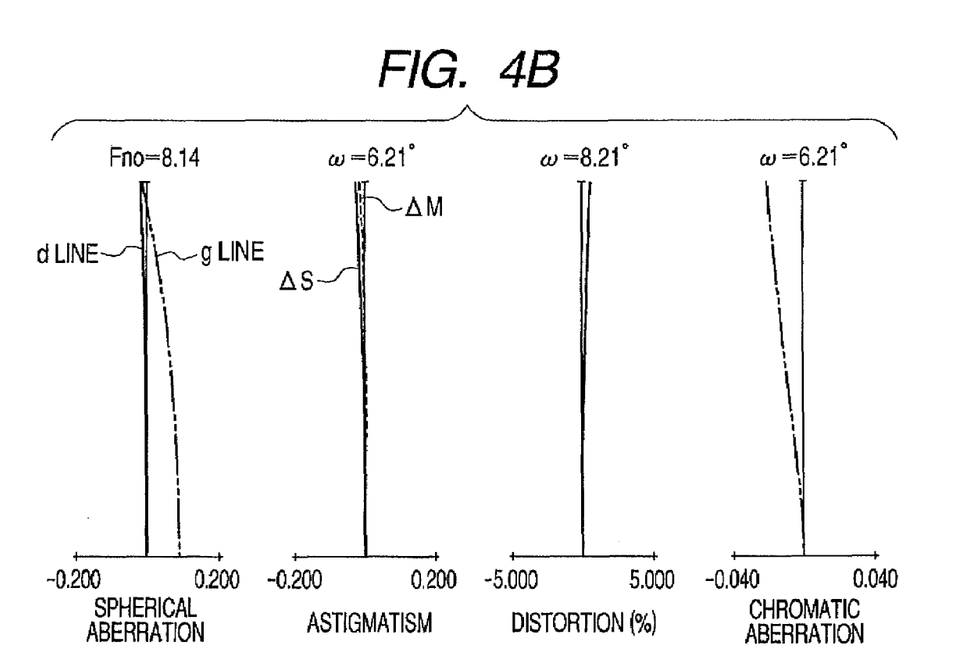

FIG. 3 is a lens sectional diagram on a wide angle end of a zoom lens according to a second embodiment. FIG. 4A is an aberration diagram on the wide angle end of the zoom lens of the second embodiment. FIG. 4B is an aberration diagram on a telephoto end of the zoom lens of the second embodiment.

Figure 5:
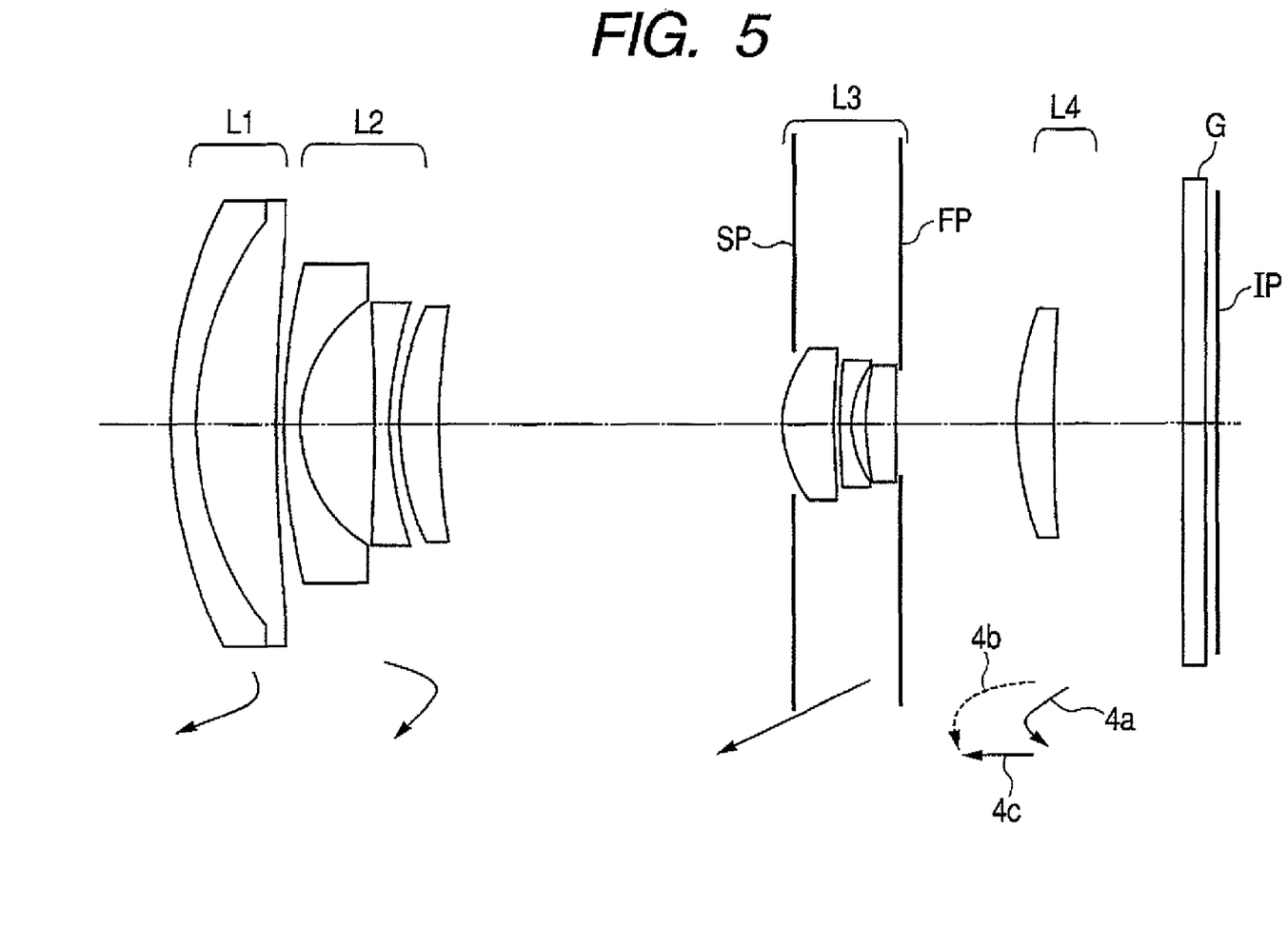
FIG. 5 is an optical sectional diagram illustrating a zoom lens according to a third embodiment
Figure 6A:
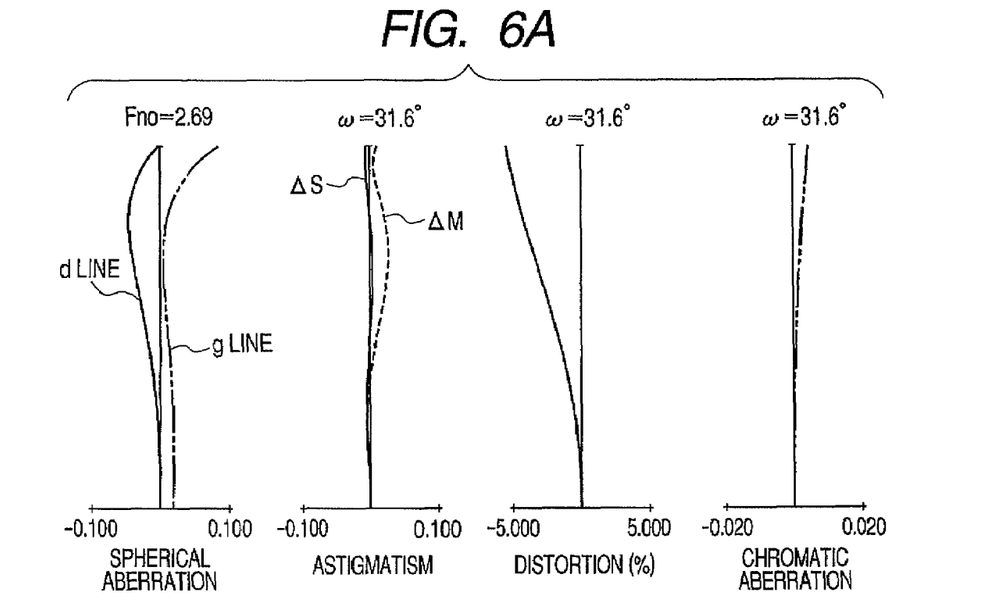
FIGS. 6A and 6B illustrate aberrations of the zoom lens of the third embodiment
Figure 6B:
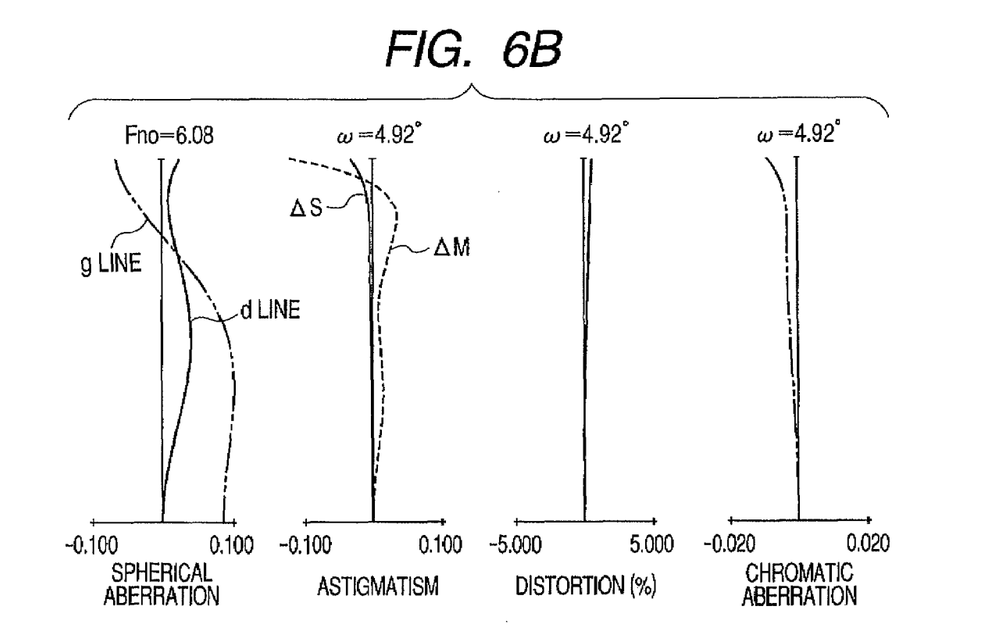

FIG. 5 is a lens sectional diagram on a wide angle end of a zoom lens according to a third embodiment. FIG. 6A is an aberration diagram on the wide angle end of the zoom lens of the third embodiment. FIG. 6B is an aberration diagram on a telephoto end of the zoom lens of the third embodiment.

Figure 7:
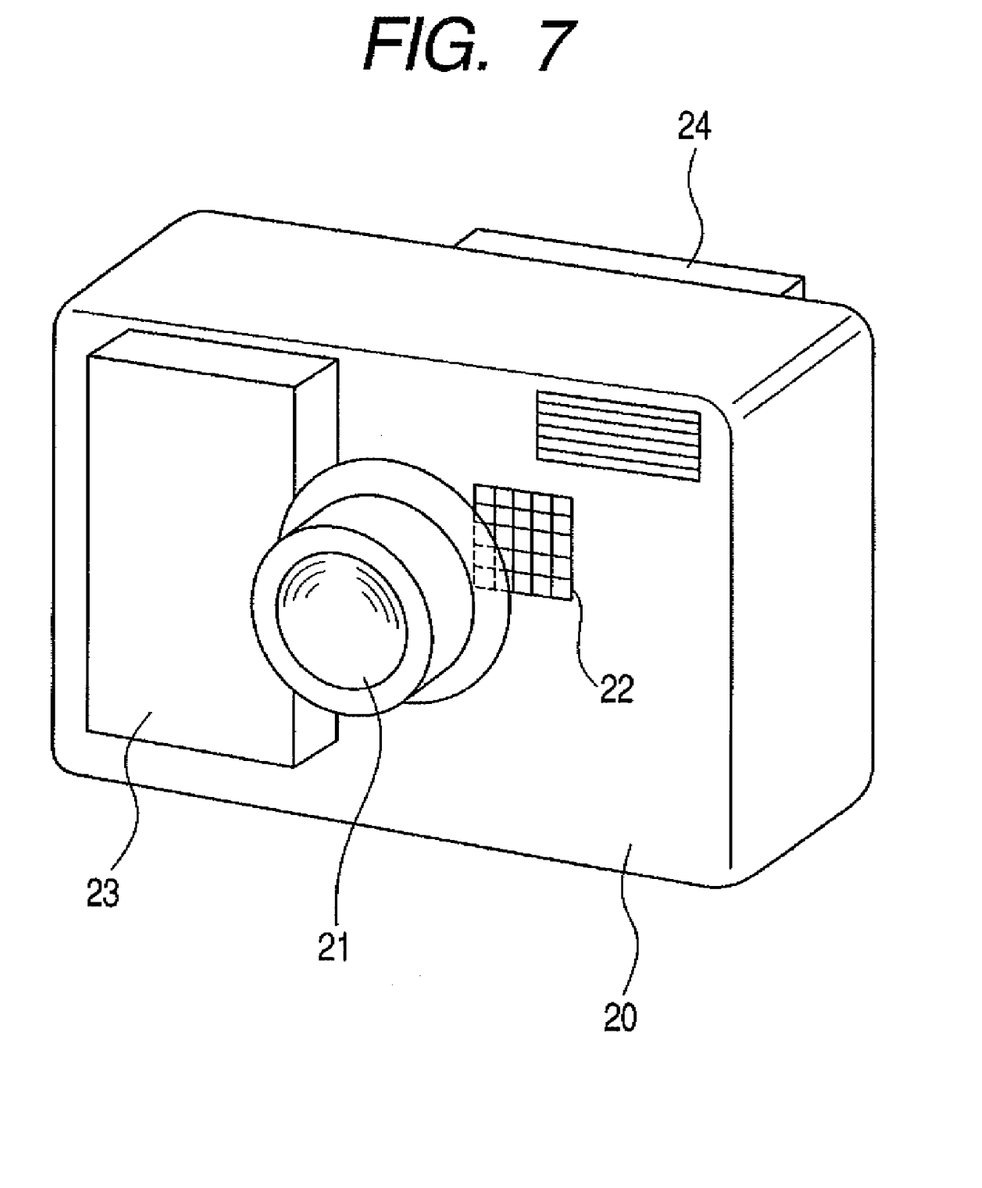
FIG. 7 is a schematic diagram illustrating a main portion of an image pickup apparatus according to the present invention.

FIG. 7 is a schematic diagram illustrating a main portion of an image pickup apparatus which includes the zoom lens of the present invention.

The zoom lens of each embodiment is an image taking lens system used for an image pickup apparatus such as a digital still camera or a video camera.

In the lens sectional diagrams, a left is an object side (front), and a right is an image side (rear).

When the zoom lens of each embodiment is used as a projection lens such as a projector, a left is a screen side, and a right is a projected image side.

Each of the lens sectional diagrams illustrates a first lens unit L1 of a positive refractive power (optical power=inverse number of focal length), a second lens unit L2 of a negative refractive power, a third lens unit L3 of a positive refractive power, and a fourth lens unit L4 of a positive refractive power.

An F-number determining stop (aperture stop) SP for limiting an open F-number beam is disposed between an object side vertex of a lens nearest to the object side in the third lens unit L3 and an intersecting point of the object-side lens surface and a peripheral portion of the lens.

The F-number determining stop SP may have its opening area set variable or invariable. A flare stop FP is disposed on an image side of the third lens unit L3 to block unnecessary lights.

An optical block G corresponds to an optical filter, a face plate, a crystal low-pass filter, or an infrared light cut filter.

On an image surface IP, there is set an image pickup surface of a solid-state image pickup device (photoelectric conversion device) such as a CCD sensor or a CMOS sensor in the case of use as an image taking optical system for a video camera or a digital still camera. In the case of a silver-halide film camera, a photosensitive surface, which corresponds to a film surface, is set thereon.

Each of the aberration diagrams illustrates a meridional image surface ΔM, a sagittal image surface ΔS, a variable power chromatic aberration denoted by a g line, a half field angle (degree) ω, and an F number Fno.

In each embodiment, a wide angle end and a telephoto end respectively indicate an arrangement of each lens unit in a minimum focal length and an arrangement of each lens unit in a maximum focal length.

Arrows indicate a moving locus of each lens unit during zooming from the wide angle end to the telephoto end, and a moving direction thereof during focusing.

In each embodiment, as indicated by the arrow during zooming from the wide angle end to the telephoto end, the first and second lens units L1 and L2 move along a locus convex to the image side. The third lens unit L3 monotonously moves to the object side.

Image surface variation accompanying variable power is corrected by moving the fourth lens unit L4 along a locus convex to the object side.

The fourth lens unit L4 is for focusing. A rear focus method that performs focusing by moving the fourth lens unit L4 on an optical axis is employed.

A solid curve line 4a and a dotted curve line 4B regarding the fourth lens unit L4 are moving loci for correcting image surface variation accompanying variable power respectively in focus on an object at infinity and a near object.

Thus, setting a moving path of the fourth lens unit L4 as a locus convex to the object side promotes effective air use between the third and fourth lens units L3 and L4, thereby effectively shortening a total lens length.

Focusing from the object at infinity to the near object on the telephoto end is carried out by delivering the fourth lens unit L4 forward as indicated by an arrow 4c.

In each embodiment, the following conditions are satisfied:

$$-0.50 < M3/Lt < -0.25 \quad (1)$$

$$0.20 < f3/ft < 0.40 \quad (2).$$

In the conditional expression (1), M3 denotes a moving amount of the third lens unit L3 on an optical axis during zooming from the wide angle end to the telephoto end, and Lt denotes a total lens length on the telephoto end.

In the conditional expression (2), f3 denotes a focal length of the third lens unit L3, and ft denotes a focal length of the entire lens system on the telephoto end.

The total lens length is represented by Da+Db, where Da represents a distance from a foremost lens surface (first lens surface) to a last lens surface, and Db represents a back focus when a length of a glass block is measured as an equivalent air length if the glass block is present between the last lens surface and the image surface.

For example, the equivalent air length of the glass block is represented by DL/n, where DL represents a length of the glass block and n represents a refractive index of a material of the glass block. A sign of the moving amount M3 is negative when the third lens unit L3 is positioned nearer to the object side on the telephoto end than the wide angle end. The sign thereof is positive in the opposite case.

In each embodiment, as the lens configuration suitable for achieving a high zoom ratio (higher magnification), refractive powers of the four lens units are set to be positive, negative, positive, and positive in order from the object side to the image side, and each lens unit is moved during zooming. A stroke of each lens unit is increased while suppressing an increase in total lens length. Thus, an increase in total lens length is prevented while realizing a high zoom ratio.

The conditional expression (1) concerns a moving amount of the third lens unit L3 during zooming.

When the moving amount of the third lens unit L3 increases exceeding a lower limit of the conditional expression (1), a change of a position in a direction perpendicular to an optical axis of screen peripheral beams passing through the third lens unit L3 on the wide angle end and the telephoto end is greater. As a result, correction of aberrations such as coma aberrations is difficult in the entire zoom region.

Over an upper limit of the conditional expression (1), a variable power load on the third lend unit L3 is reduced. As a result, in order to obtain a high zoom ratio, variable power loads on the first and second lens units L1 and L2 have to be increased by increasing an interval change between the first and second lens units L1 and L2 or shortening focal lengths of the first and second lens units L1 and L2.

However, when the moving amounts of the first and second lens units L1 and L2 are increased to enlarge the interval change therebetween, a change of a position in a direction perpendicular to the optical axis of the screen peripheral beam passing through the first and second lens units L1 and L2 on the wide angle end and the telephoto end becomes too large. As a result, on the telephoto end, correction of image surface distortion on the screen periphery is inadequate. Shortening (reducing) of focal lengths of the first and second lens units L1 and L2 is not advisable, because a curvature radius of each lens surface becomes smaller so that a thickness of each lens unit is increased to secure an edge or a thickness. Shortening a focal length of the third lens unit L3 enables an increase of a variable power ratio of the third lens unit L3. In this case, a focal length of the third lens unit L3 may be set within the range of the conditional expression (2).

When the focal length of the third lens unit L3 is shortened below a lower limit of the conditional expression (2), especially, a curvature radius of a concave surface in the third lens unit L3 becomes smaller. As a result, aberrations such as coma aberrations caused by the change of the position in the direction perpendicular to the optical axis when the peripheral beam passes through the concave surface greatly vary, and correction of the aberrations in the entire zoom region is difficult.

The increase of the focal length over an upper limit of the conditional expression (2) is not preferable, because variable power loads on the third lens unit L3 are reduced, necessitating an increase of variable power loads on the first and second lens units L1 and L2 as described above.

More preferably, numerical value ranges of the conditional expressions (1) and (2) may be set as follows:

$$-0.35 < M3/Lt < -0.27 \quad (1a)$$

$$0.25 < f3/ft < 0.35 \quad (2a).$$

The configuration of the present invention secures a high zoom ratio of 5 times or more, provides high optical performance in all the zoom areas, and facilitates miniaturization of the entire system.

Hereinafter, more preferable requirements of the embodiments of the zoom lens of the present invention are described.

The following condition may be satisfied, where $\beta 3t$ represents an imaging magnification on the telephoto end of the third lens unit L3, and $\beta 3w$ represents an imaging magnification on the wide angle end of the third lens unit L3:

$$3.0 < \beta 3t/\beta 3w < 6.0 \quad (3).$$

When the variable power load accompanying zooming of the third lens unit L3 is reduced below a lower limit of the conditional expression (3), variable power loads on the first and second lens units L1 and L2 have to be increased to achieve a high zoom ratio.

Thus, shortening of focal lengths of the first and second lens units L1 and L2 is not advisable, because a curvature radius of each lens surface becomes smaller, increasing thicknesses of the first and second lens units L1 and L2. Increasing the interval change to enlarge variable power loads during zooming of the first and second lens units L1 and L2 is not preferable, because a total lens length is extended.

Over an upper limit of the conditional expression (3), the moving amount accompanying zooming of the third lens unit L3 is excessively increased, and a focal length is excessively shortened to increase a thickness of the third lens unit L3, extending a total lens length. Good correction of aberrations such as coma aberrations in the entire zoom region is difficult.

More preferably, a numerical value range of the conditional expression (3) may be set as follows:

$$3.0 < \beta 3t/\beta 3w < 4.0 \quad (3a).$$

The following condition may be satisfied, where Lw represents a total lens length and fw represents a focal length of the entire lens system on the wide angle end:

$$5.0 < (Lw \times Lt)/(fw \times ft) < 11.0 \quad (4).$$

Below a lower limit of the conditional expression (4), the total lens length with respect to the focal length becomes too short on both of the wide angle end and the telephoto end, causing difficulty in arranging a necessary number of lenses or securing a moving amount of each lens unit. As a result, achievement of a high zoom ratio while maintaining adequate optical performance is difficult.

Over an upper limit, the total lens length becomes excessively large, causing difficulty in miniaturizing the entire system.

More preferably, a numerical value range of the conditional expression (4) may be set as follows:

$$7.0 < (Lw \times Lt)/(fw \times ft) < 10.6 \quad (4a).$$

The following condition may be satisfied, where $\beta 2t$ represents an imaging magnification on the telephoto end of the second lens unit L2, $\beta 2w$ represents an imaging magnification on the wide angle end of the second lens unit L2, $\beta 4t$ represents an imaging magnification on the telephoto end of the fourth lens unit L4, and $\beta 4w$ represents an imaging magnification on the wide angle end of the fourth lens unit L4:

$$1.6 < (\beta 2t \times \beta 4t)/(\beta 2w \times \beta 4w) < 2.5 \quad (5).$$

Below a lower limit of the conditional expression (5), variable power loads on the second and fourth lens unit L2 and L4 become too small. Thus, when a high zoom ratio is to be maintained, a moving amount of the third lens unit L3 is excessively increased, or a focal length of the third lens unit L3 is excessively shortened, causing difficulty in correcting aberrations such as coma aberrations well in the entire zoom lens. Over an upper limit thereof, variable power loads on the second and fourth lens unit L2 and L4 are enlarged, necessitating shortening of focal lengths of the first, second, and fourth lens units L1, L2, and L4 or an increase of a moving amount accompanying zooming. As a result, disadvantageously, a thickness of each lens unit is increased or the total lens length is extended.

More preferably, a numerical value range of the conditional expression (5) may be set as follows:

$$1.6 < (\beta 2t \times \beta 4t)/(\beta 2w \times \beta 4w) < 2.3 \quad (5a).$$

The following condition may be satisfied, where Dt represents an effective diameter of a lens surface having an incident height set maximum when a beam emitted from a point light source at infinity on the optical axis enters each lens before the beam reaches the image surface:

$$0.08 < Dt/ft < 0.17 \quad (6).$$

Over an upper limit of the conditional expression (6), a width of a focal depth on the telephoto end becomes excessively small, causing stricter requirements on manufacturing errors such as image surface tilting. As a result, manufacturing of a zoom lens having a high zoom ratio and relatively large moving amounts of lens units on a wide angle end and a telephoto end is difficult. Below a lower limit thereof, contrast is disadvantageously lowered due to an influence of diffraction.

More preferably, a numerical value range of the conditional expression (6) may be set as follows:

$$0.120 < Dt/ft < 0.165 \quad (6a).$$

In each embodiment, at least one of the conditional expressions (3) to (6) may be satisfied.

The lens nearest to the object side in the third lens unit L3 may have a convex surface on the object side, and an F-number determining member SP for determining an open F-number beam may be disposed between an object side vertex of the lens and an intersecting point of the object-side lens surface and the peripheral portion of the lens.

Thus, no aperture stop member needs to be disposed separately from the third lens unit L3, and hence an interval between the second and third lens units L2 and L3 on the telephoto end can be easily reduced. As a result, a moving amount of the third lens unit L3 can be enlarged and an interval between the first and second lens units L1 and L2 can be increased, and hence a high zoom ratio can be easily achieved even with a short total lens length.

In each embodiment, during zooming from the wide angle end to the telephoto end, the first lens unit L1 is moved along a locus convex to the image side, and the second lens unit L2 is moved along a locus convex to the image side. Thus, in a zoom position near the wide angle end where an incident height (distance from the optical axis) of an off axis beam on the lens surface is largest, the first lens unit L1 can be moved to the image side so as to be nearer to the aperture stop SP as compared with the telephoto end. As a result, an incident height of rays passing through the first lens unit L1 can be set small, enabling further miniaturization of the first lens unit L1. By moving the second lens unit L2 along the locus convex to the image side, an interval between the first lens unit L1 and the aperture stop SP is not enlarged near the telephoto end, and the off axis beam is made less likely to be partially vignetted.

The present invention employs a rear focus method which performs focusing by moving the compact and light fourth lens unit L4 on the optical axis. Thus, a weight of the lens unit moved for focusing can be reduced, and hence fast focusing is facilitated.

The third lens unit L3 includes one or more aspherical surfaces. Thus, aberrations such as spherical aberrations are effectively corrected.

The third lens unit L3 is moved to have a component in a direction perpendicular to the optical axis, thereby changing an imaging position in a direction perpendicular to the optical axis. Thus, without adding any new prism or lens unit to prevent shaking, an image blur caused by hand fluctuation is effectively suppressed.

Next, a lens configuration of each embodiment of the present invention is described.

In the zoom lens of each embodiment, the first lens unit includes a junction lens formed by joining, in order from the object side to the image side, a meniscus negative lens having a convex surface on the object side and a positive lens. Variation in magnification chromatic aberration during zooming is accordingly rectified.

The second lens unit L2 includes, in order from the object side to the image side, a meniscus negative lens having a convex surface on the object side, a negative lens of a double-concave shape, and a positive lens having a convex surface on the object side. Aberration variation during zooming is accordingly reduced. By disposing the two negative lenses, in the second lens unit L2 of an overall negative refractive power, concentration of a negative refractive power on one negative lens to deteriorate coma aberrations due to an excessively small curvature radius of the lens surface is prevented.

The third lens unit L3 includes two positive lenses and one negative lens. Variation of on-axis chromatic aberrations during zooming is accordingly rectified, and variation of aberrations is reduced. By disposing the two positive lenses, in the third lens unit L3 of an overall positive refractive power, concentration of a positive refractive power on one positive lens to deteriorate coma aberrations due to an excessively small curvature radius of the lens surface is prevented. The lenses of the third lens unit L3 may be joined. With this structure, relative eccentricity in the lens unit is reduced, and the lenses may not be joined. This structure is preferable because the number of lens surfaces increases to heighten designing freedom.

The fourth lens unit L4 includes one positive lens. Thus, a retracted length is shortened, and the fourth lens unit L4 that moves during focusing is light, facilitating quick focusing.

This configuration enables shortening of the total lens length and achievement of a high zoom ratio and high optical performance within all the zoom range from the wide angle end to the telephoto end.

In each embodiment, one or more lens units having refractive powers may be disposed on the object side of the first lens unit L1 and/or on the image side of the fourth lens unit L4.

Numerical embodiments 1 to 3 corresponding to the first to third embodiments are described below. Each numerical embodiment shows order i of surfaces from the object side.

The numerical embodiment shows a curvature radius ri of an i-th lens surface (i-th surface) in order from the object side, an interval di between the i-th surface and an (i+1)-th surface, and a refractive index ndi and an Abbe number vdi with a d line being a reference.

An equivalent air length BF is from a last lens surface to a paraxial image surface. A unit of a value for length is mm unless specified otherwise.

Two surfaces nearest to the image side constitute a filter member. When the lens surface is aspherical, * is added after a surface number.

The shape is represented by the following expression, where X represents a position in an optical axis direction, H represents a position in a direction orthogonal to the optical axis, a light advancing direction is positive, R represents a paraxial curvature radius, K represents a conical coefficient, and A to D represent aspherical coefficients.

$$X = \frac{\left(\frac{1}{R}\right)H^2}{1 + \sqrt{1 - (1+K)\left(\frac{H}{R}\right)^2}} + AH^2 + BH^4 + CH^6 + DH^8 \qquad \text{Expression 1}$$

In the expression, "e±N" indicates "×10±N". Table 1 shows correspondence with the conditional expressions of each embodiment.

In the numerical embodiment, a value of d10 is negative. This is because of counting the F-number determining stop SP and the lenses of the third lens unit on the object side in order from the object side.

An SP stop means an F-number determining stop, and an FP stop means a flare cut stop.

Numerical Embodiment 1

| Unit: mm | | | | |
|---|---|---|---|---|
| Surface data | | | | |
| Surface number | r | d | nd | vd |
| 1 | 28.568 | 0.90 | 1.84666 | 23.9 |
| 2 | 15.653 | 3.20 | 1.83481 | 42.7 |
| 3 | 1500.778 | (Variable) | | |
| 4 | 52.751 | 0.70 | 1.88300 | 40.8 |
| 5 | 6.507 | 3.10 | | |

-continued

Unit: mm

| | | | | |
|---|---|---|---|---|
| 6 | −26.085 | 0.50 | 1.69680 | 55.5 |
| 7 | 47.401 | 0.40 | | |
| 8 | 13.148 | 1.40 | 1.92286 | 18.9 |
| 9 | 35.542 | (Variable) | | |
| 10 SP stop | | −0.30 | | |
| 11* | 6.197 | 2.10 | 1.58313 | 59.4 |
| 12* | −21.638 | 0.20 | | |
| 13 | 5.137 | 1.40 | 1.51742 | 52.4 |
| 14 | 14.073 | 0.50 | 1.80518 | 25.4 |
| 15 | 3.684 | 0.50 | | |
| 16 FP stop | | (Variable) | | |
| 17 | 14.217 | 1.70 | 1.69680 | 55.5 |
| 18 | 86.474 | (Variable) | | |
| 19 | ∞ | 1.00 | 1.51633 | 64.1 |
| 20 | ∞ | (Variable) | | |

Aspherical surface data

Eleventh surface

K = −5.49106e−001    B = −1.27242e−004    C = −4.81677e−006

Twelfth surface

K = −3.03419e+001    B = −1.49147e−004    C = 1.30929e−006

-continued

Unit: mm

Various data

| | | | | | |
|---|---|---|---|---|---|
| Zoom ratio | | | 5.75 | | |
| Focal length | 6.55 | 9.83 | 15.70 | 23.47 | 37.65 |
| F-number | 3.26 | 3.64 | 4.22 | 4.85 | 6.08 |
| Field angle | 30.61 | 21.52 | 13.86 | 9.38 | 5.88 |
| Image height | 3.88 | 3.88 | 3.88 | 3.88 | 3.88 |
| Total lens length | 43.83 | 41.89 | 43.68 | 47.89 | 55.30 |
| BF | 5.41 | 7.08 | 8.79 | 9.63 | 6.81 |
| d 3 | 0.40 | 2.68 | 5.81 | 8.76 | 11.87 |
| d 9 | 16.20 | 9.94 | 5.20 | 2.39 | 0.70 |
| d 16 | 5.53 | 5.89 | 7.59 | 10.81 | 19.62 |
| d 18 | 4.25 | 5.92 | 7.63 | 8.47 | 5.65 |
| d 20 | 0.50 | 0.50 | 0.50 | 0.50 | 0.50 |

Zoom lens unit data

| Unit | First surface | Focal length |
|---|---|---|
| 1 | 1 | 35.25 |
| 2 | 4 | −8.99 |
| 3 | 10 | 11.76 |
| 4 | 17 | 24.18 |

Numerical Embodiment 2

Unit: mm

Surface data

| Surface number | r | d | nd | νd |
|---|---|---|---|---|
| 1 | 30.541 | 0.80 | 1.84666 | 23.9 |
| 2 | 17.397 | 2.90 | 1.80400 | 46.6 |
| 3 | 14437.816 | (Variable) | | |
| 4 | 41.120 | 0.70 | 1.88300 | 40.8 |
| 5 | 6.544 | 3.10 | | |
| 6 | −21.290 | 0.50 | 1.69680 | 55.5 |
| 7 | 78.509 | 0.40 | | |
| 8 | 13.223 | 1.40 | 1.92286 | 18.9 |
| 9 | 37.291 | (Variable) | | |
| 10 SP stop | | −0.30 | | |
| 11* | 6.192 | 2.00 | 1.58313 | 59.4 |
| 12* | −22.887 | 0.20 | | |
| 13 | 5.184 | 1.40 | 1.51742 | 52.4 |
| 14 | 13.142 | 0.50 | 1.80518 | 25.4 |
| 15 | 3.638 | 0.50 | | |
| 16 FP stop | | (Variable) | | |
| 17 | 13.389 | 1.70 | 1.69680 | 55.5 |
| 18 | 103.159 | (Variable) | | |
| 19 | ∞ | 1.00 | 1.51633 | 64.1 |
| 20 | ∞ | (Variable) | | |

-continued

Unit: mm

Aspherical surface data

Eleventh surface

K = −5.83859e−001  B = −1.29515e−004  C = −3.91259e−006  D = 5.76005e−008

Twelfth surface

K = −2.94728e+001  B = −1.42203e−004  C = 5.17729e−007  D = 2.36372e−007

Various data

| Zoom ratio | | | 5.31 | | |
|---|---|---|---|---|---|
| Focal length | 6.70 | 9.68 | 15.47 | 22.74 | 35.60 |
| F-number | 4.75 | 5.22 | 6.02 | 6.80 | 8.14 |
| Field angle | 30.04 | 21.82 | 14.07 | 9.67 | 6.21 |
| Image height | 3.88 | 3.88 | 3.88 | 3.88 | 3.88 |
| Total lens length | 43.49 | 41.56 | 43.77 | 48.71 | 56.81 |
| BF | 5.82 | 7.52 | 9.44 | 10.33 | 7.90 |
| d 3 | 0.40 | 2.64 | 6.34 | 10.01 | 14.29 |
| d 9 | 15.89 | 9.85 | 4.90 | 2.25 | 0.81 |
| d 16 | 5.58 | 5.75 | 7.29 | 10.32 | 18.02 |
| d 18 | 4.66 | 6.36 | 8.28 | 9.17 | 6.74 |
| d 20 | 0.50 | 0.50 | 0.50 | 0.50 | 0.50 |

Zoom lens unit data

| Unit | First surface | Focal length |
|---|---|---|
| 1 | 1 | 39.61 |
| 2 | 4 | −9.59 |
| 3 | 10 | 12.24 |
| 4 | 17 | 21.91 |

Numerical Embodiment 3

Unit: mm

Surface data

| Surface number | r | d | nd | νd |
|---|---|---|---|---|
| 1 | 21.017 | 1.10 | 1.84666 | 23.9 |
| 2 | 14.047 | 3.50 | 1.77250 | 49.6 |
| 3 | 96.418 | (Variable) | | |
| 4 | 28.407 | 0.70 | 1.88300 | 40.8 |
| 5 | 6.122 | 3.20 | | |
| 6 | −62.491 | 0.60 | 1.77250 | 49.6 |
| 7 | 14.195 | 0.40 | | |
| 8 | 10.646 | 1.70 | 1.92286 | 18.9 |
| 9 | 30.111 | (Variable) | | |
| 10 SP stop | | −0.50 | | |
| 11* | 5.045 | 2.25 | 1.80447 | 40.9 |
| 12* | 38.529 | 0.20 | | |
| 13 | 21.194 | 0.50 | 1.80809 | 22.8 |
| 14 | 4.183 | 0.60 | | |
| 15 | 11.043 | 1.30 | 1.69680 | 55.5 |
| 16 | −67.906 | 0.18 | | |
| 17 FP stop | | (Variable) | | |
| 18 | 13.870 | 1.60 | 1.60311 | 60.6 |
| 19 | 81.251 | (Variable) | | |
| 20 | ∞ | 1.00 | 1.51633 | 64.1 |
| 21 | ∞ | | | |

-continued

Unit: mm

Aspherical surface data

Eleventh surface

K = −7.29620e−004   B = −3.58262e−004   C = −2.87700e−006   D = −5.14369e−007

Twelfth surface

K = −2.13283e+001   B = 1.28553e−004   C = 1.02419e−005

Various data

| Zoom ratio | | | 7.13 | | |
|---|---|---|---|---|---|
| Focal length | 6.31 | 11.73 | 16.86 | 34.12 | 44.97 |
| F-number | 2.69 | 3.21 | 3.61 | 4.86 | 6.08 |
| Field angle | 31.57 | 18.27 | 12.95 | 6.48 | 4.92 |
| Image height | 3.88 | 3.88 | 3.88 | 3.88 | 3.88 |
| Total lens length | 45.17 | 46.97 | 49.81 | 58.16 | 63.38 |
| BF | 0.50 | 0.50 | 0.50 | 0.50 | 0.50 |
| d 3 | 0.30 | 5.28 | 8.03 | 12.03 | 12.08 |
| d 9 | 15.31 | 8.59 | 5.84 | 1.93 | 0.85 |
| d 17 | 5.05 | 7.50 | 10.00 | 19.63 | 27.59 |
| d 19 | 5.68 | 6.77 | 7.11 | 5.74 | 4.03 |

Zoom lens unit data

| Unit | First surface | Focal length |
|---|---|---|
| 1 | 1 | 35.88 |
| 2 | 4 | −8.11 |
| 3 | 10 | 12.01 |
| 4 | 18 | 27.49 |

TABLE 1

| | Conditional expression | First embodiment | Second embodiment | Third embodiment |
|---|---|---|---|---|
| (1) | M3/Lt | −0.280 | −0.256 | −0.331 |
| (2) | f3/fw | 0.312 | 0.344 | 0.267 |
| (3) | β3t/β3w | 3.177 | 3.039 | 3.266 |
| (4) | (Lw × Lt)/(fw × ft) | 9.966 | 10.500 | 10.095 |
| (5) | (β2t × β4t)/(β2w × β4w) | 1.809 | 1.748 | 2.184 |
| (6) | Dt/ft | 0.164 | 0.123 | 0.164 |

Next, referring to FIG. 7, an embodiment of a digital still camera using the zoom lenses of the first to third embodiments as image taking optical systems is described.

In FIG. 7, the digital still camera includes: a camera main body 20; an image taking optical system 21 including any one of the zoom lenses of the first to third embodiments; a solid-state image pickup device (photoelectric conversion device) 22 such as a CCD sensor or a CMOS sensor, which is built in the camera main body to receive an object image formed by the image taking optical system 21; a memory 23 for recording information corresponding to the object image photoelectrically converted by the solid-state image pickup device 22; and a viewfinder 24 including a liquid crystal display panel to observe the object image formed on the solid-state image pickup device 22.

Thus, applying the zoom lens of the present invention to the image pickup apparatus such as a digital still camera enables realization of a compact and high optical performance image pickup apparatus.

The zoom lens of the present invention can be similarly applied to a single lens reflex camera or a video camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-142351, filed May 30, 2008, which is hereby incorporated by reference in its entirety.

What is claimed is:

1. A zoom lens, comprising in order from an object side to an image side:
    a first lens unit having a positive refractive power;
    a second lens unit having a negative refractive power;
    a third lens unit having a positive refractive power; and
    a fourth lens unit having a positive refractive power,
        each of the first lens unit, the second lens unit, the third lens unit, and the fourth lens unit moving to perform zooming,
    wherein the following conditions are satisfied:

$$-0.50 < M3/Lt < -0.25; \text{ and}$$

$$0.20 < f3/ft < 0.40,$$

where M3 represents a moving amount of the third lens unit on an optical axis during zooming from a wide angle end to a telephoto end, Lt represents a total lens length on the telephoto end, f3 represents a focal length of the third lens unit, and ft represents a focal length of an entire lens system on the telephoto end.

2. A zoom lens according to claim 1, wherein the following condition is satisfied:

$$3.0 < \beta3t/\beta3w < 6.0,$$

where $\beta 3t$ and $\beta 3w$ represent imaging magnifications on the telephoto end and the wide angle end of the third lens unit.

3. A zoom lens according to claim 1, wherein the following condition is satisfied:

$$5.0 < (Lw \times Lt)/(fw \times ft) < 11.0,$$

where Lw represents a total lens length on the wide angle end, and fw represents a focal length of the entire lens system on the wide angle end.

4. A zoom lens according to claim 1, wherein the following condition is satisfied:

$$1.6 < (\beta 2t \times \beta 4t)/(\beta 2w \times \beta 4w) < 2.5,$$

where $\beta 2t$ and $\beta 2w$ represent imaging magnifications on a telephoto end and a wide angle end of the second lens unit, and $\beta 4t$ and $\beta 4w$ represent imaging magnifications on a telephoto end and a wide angle end of the fourth lens unit.

5. A zoom lens according to claim 1, wherein a lens of the third lens unit, which is positioned nearest to the object side, has a convex surface on an object side thereof, and includes an F-number determining member for determining an open F-number beam between a vertex on the object side of the lens and an intersecting point of a surface on the object side and a peripheral portion of the lens.

6. A zoom lens according to claim 1, wherein the following condition is satisfied:

$$0.08 < Dt/ft < 0.17,$$

where Dt represents an effective diameter of a lens surface having a maximum incident height when a beam emitted from a point light source at infinity on an optical axis enters each lens surface on a telephoto end of the zoom lens.

7. A zoom lens according to claim 1, wherein each of the first lens unit and the second lens unit moves along a locus convex on the image side during the zooming.

8. A zoom lens according to claim 1, wherein the fourth lens unit comprises a lens unit for focusing.

9. A zoom lens according to claim 1, wherein the third lens unit includes at least one aspherical surface.

10. A zoom lens according to claim 1, wherein the third lens unit is moved to have a component in a direction perpendicular to the optical axis so as to change an imaging position in the direction perpendicular to the optical axis.

11. A zoom lens according to claim 1, which forms an image on a solid-state image pickup device.

12. An image pickup apparatus, comprising:
the zoom lens according to claim 1; and
a solid-state image pickup device for receiving an image formed by the zoom lens.

* * * * *